US009649806B2

(12) United States Patent
Le Roux et al.

(10) Patent No.: US 9,649,806 B2
(45) Date of Patent: May 16, 2017

(54) DEVICE FOR GRIPPING A CONTAINER COMPRISING A NOSE WHEREIN EXPANSION JAWS ARE HELD CIRCUMFERENTIALLY IN POSITION

(71) Applicant: SIDEL PARTICIPATIONS, Octeville sur Mer (FR)

(72) Inventors: Julien Le Roux, Octeville sur Mer (FR); Yves-Alban Duclos, Octeville sur Mer (FR); Pierre Heuzebroc, Octeville sur Mer (FR); Franck Lacaille, Octeville sur Mer (FR); Nicolas Chomel, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/917,075

(22) PCT Filed: Oct. 2, 2014

(86) PCT No.: PCT/EP2014/071189
§ 371 (c)(1),
(2) Date: Mar. 7, 2016

(87) PCT Pub. No.: WO2015/052079
PCT Pub. Date: Apr. 16, 2015

(65) Prior Publication Data
US 2016/0207244 A1    Jul. 21, 2016

(30) Foreign Application Priority Data

Oct. 9, 2013   (FR) ..................... 13 59796

(51) Int. Cl.
*B29C 49/42*   (2006.01)
*B29C 49/06*   (2006.01)

(52) U.S. Cl.
CPC .......... *B29C 49/4205* (2013.01); *B29C 49/06* (2013.01)

(58) Field of Classification Search
CPC .................................................. B29C 49/4205
See application file for complete search history.

(56) References Cited

U.S. PATENT DOCUMENTS 6,106,273 A    8/2000   O'Dell
7,008,215 B2 *  3/2006   Goss .................. B29C 49/4205
                                                         198/617
(Continued)

FOREIGN PATENT DOCUMENTS

DE    10 2011 113 310 A1    3/2013

OTHER PUBLICATIONS

International Search Report, dated Nov. 4, 2014, from corresponding PCT Application.

*Primary Examiner* — Robert B Davis
(74) *Attorney, Agent, or Firm* — Young & Thompson

(57) ABSTRACT

A device (20) for gripping a container (16) made of a thermoplastic material, includes: a nose (30) having a main shaft (B) which is suitable for axially inserting into the neck (24) of the container (16); a plurality of jaws (46) which are mounted in the nose (30) in a radially mobile manner between a retracted position allowing the free axial sliding of the nose (30) in the neck (24) and an expanded position allowing the immobilization of the neck (24) in relation to the nose (30) by pressing against the inner part of the neck (24); and elements (54) for elastically returning the jaws to their expanded position, wherein the jaw assembly (46) is maintained circumferentially in a determined circumferential position in relation to the nose (30).

19 Claims, 5 Drawing Sheets

(56) References Cited

U.S. PATENT DOCUMENTS

| | | | | |
|---|---|---|---|---|
| 7,021,921 B2* | 4/2006 | Zoppas | ............... | B29C 49/4205 198/803.7 |
| 7,284,778 B1* | 10/2007 | Pellegatta | ........... | B29C 49/4205 294/90 |
| 7,771,188 B2* | 8/2010 | Dujardin | ............. | B29C 49/4205 198/803.7 |
| 8,567,589 B2* | 10/2013 | Schonberger | ....... | B29C 49/4205 198/465.4 |
| 8,640,860 B2* | 2/2014 | Leroux | ............... | B29C 49/4205 198/803.12 |
| 9,067,742 B2* | 6/2015 | Duclos | ................ | B29C 49/4205 |
| 2004/0047940 A1 | 3/2004 | Zoppas | | |
| 2005/0092892 A1 | 5/2005 | Goss | | |
| 2014/0161924 A1 | 6/2014 | Linke et al. | | |
| 2016/0016349 A1* | 1/2016 | Morin | ................ | B29C 49/4205 294/195 |

\* cited by examiner

DEVICE FOR GRIPPING A CONTAINER COMPRISING A NOSE WHEREIN EXPANSION JAWS ARE HELD CIRCUMFERENTIALLY IN POSITION

TECHNICAL FIELD OF THE INVENTION

The invention relates to a device for gripping a container made of thermoplastic material.

The invention relates more particularly to a device for gripping a container made of thermoplastic material, in particular a preform that is intended to be shaped into a final container, with the gripping device comprising:
- A head that has a main axis and that is suitable for being inserted axially into the neck of the container;
- At least three jaws (in the shape of an angular sector) that are distributed uniformly around the axis of the nose and that are mounted to move radially in the nose between a retracted position that makes possible the axial sliding of the nose in the neck and an expanded position that makes possible the gripping of the neck in relation to the nose by pressing against the inside wall of the neck;
- Elastic return means of the jaws toward their expanded position.

TECHNICAL BACKGROUND OF THE INVENTION

It is known to manufacture containers of thermoplastic material by forming preforms, for example by blow molding or by stretch blow molding.

The preforms are in general manufactured by injection molding. A preform has a body that is intended to be stretched to be shaped into the final container during the forming operation. The preform also has a neck that is injected into its final shape. It is therefore important to protect the neck throughout the process for transforming the preform into the final container.

To carry out the forming operation, it is necessary to heat in advance the bodies of the cold preforms at a glass transition temperature so as to make them malleable. The facilities for mass-producing containers for this purpose comprise furnaces for heating preforms.

A heating furnace in general has the shape of a tunnel in which at least one of the walls comprises heating means. The preforms move along the tunnel in front of the heating means while turning round and round so that their bodies are heated in a uniform manner to a temperature that is suitable for the forming operation.

For this purpose, the furnace comprises a device for transporting preforms that in general comes in the form of a closed chain, each link of which forms a movable support that is provided with an associated device for gripping a preform.

Each transporting device comprises an end mandrel that is formed by a head in which the jaws are mounted to slide radially, with the jaws being returned to an expanded position by an elastic ring that is inserted between the jaws and the nose. The nose that is equipped with jaws thus forms a radial expansion mandrel that is forced inside the neck of the preform.

The nose is engaged with the neck of the preform during an insertion operation that is sometimes called "covering."

At the outlet of the furnace, the preforms are transferred to a forming station, by blow molding or by liquid injection, by means of a transfer wheel. During the passage of preforms from the furnace to the transfer wheel, the mandrels are extracted from the neck of the preforms so that the preforms are ejected from the transporting device during an ejection operation, sometimes called "uncovering." The thus ejected preforms are received in suitable slots of the transfer wheel.

The machines for mass-producing containers should allow preforms to move at high speed into the furnace. This involves being able to carry out the operations for inserting preforms and the operations for ejecting preforms at a fast enough rate not to slow down the movement of the preforms into the furnace.

In the known gripping devices, the jaws are free to move circumferentially in relation to the nose. The jaw assembly is thus free to rotate around the main axis of the nose.

Circumferential operational play is in general provided between two adjacent jaws for making possible a free individual movement of each jaw. This makes it possible in particular to ensure that the insertion operation takes place under the best conditions.

Nevertheless, it happens that all of the jaws wind up crammed together circumferentially on one side of the nose. Thus, a single circumferential operational play is expanded while the other circumferential operational plays are reduced to zero. The result is that the jaws lose certain degrees of freedom of movement, thus creating the danger that the nose will be prevented from being correctly inserted into the neck of the preform.

In addition, the single existing circumferential play accumulates the operational plays that are normally provided. The ring made of elastomer material then runs the risk of forming a hernia in the single circumferential play, locking the jaws in their crammed-together position. In addition, in this configuration, the elastic ring is no longer able to become deformed enough to allow a return of the jaws toward a retracted position. This therefore runs the risk of compromising the ejection operation.

BRIEF SUMMARY OF THE INVENTION

The invention proposes an improved gripping device of the type described above, characterized in that the jaw assembly is held circumferentially in a circumferential position that is determined in relation to the nose by individual circumferential immobilization means of at least one jaw.

According to other characteristics of the invention:
- Keeping the jaw assembly in the circumferential position is done by individually immobilizing each jaw circumferentially in relation to the nose by means of a guide pin that is stationary in relation to one of the elements between said jaw and the nose, with the guide pin being accommodated by sliding into a groove that is stationary in relation to the other one of the elements between said jaw and the nose;
- The groove and the guide pin are positioned in an axial plane oriented along the radial axis of displacement of said jaw;
- The guide pin is stationary in relation to the nose, while the groove is stationary in relation to said jaw;
- The guide pin has a main axis that is parallel to the axis of the nose;
- The guide pin has a shape that is suitable for allowing angular travel of the jaw in relation to the nose around an axis that is parallel to the axis of the nose;
- The elastic return means are formed by a ring made of elastomer material that is inserted radially between the nose and the jaws;

The gripping device comprises at least one axial pin for ejecting the container that is mounted to slide axially in relation to the nose between an upper rest position in which a free end of the pin is arranged axially above the jaws, and a lower ejection position in which the free end of the ejection pin is arranged axially below the jaws;

During its sliding, each ejection pin is able to come into contact with an imaginary cylinder circumscribing the jaws in the expanded position, one passage being provided in the jaws at the intersection between the circumscribed imaginary cylinder and each ejection pin for making it possible for each pin to slide toward its ejection position without colliding with the jaws;

The jaws comprise at least one flat surface forming the passage of the associated pin;

The gripping device comprises a shoulder face in relation to the nose that is intended to abut against a rim of the neck when the nose is inserted into the neck, with the ejection pin passing through the shoulder face for the benefit of an opening that segments the annular stop surface intended to be effectively in contact with the rim;

The gripping device comprises a radiator that is arranged above the nose and that extends in radial projection in relation to the nose;

The radiator is immobilized in rotation by a head that forms the upper end of at least one of the guide pins.

The invention also relates to a device for transporting a preform into a furnace for heating a facility for forming containers of thermoplastic material, with the preform being obtained by injection molding and comprising, at an upper axial end of its body, a tubular neck that is injected directly into its final shape, characterized in that the preform is held on the transporting device by a gripping device produced according to the teachings of the invention.

BRIEF DESCRIPTION OF THE FIGURES

Other characteristics and advantages of the invention will emerge during the reading of the detailed description that will follow for the understanding of which reference will be made to the accompanying drawings in which.

DETAILED DESCRIPTION OF THE FIGURES

In the description below, elements having an identical structure or analogous functions will be designated by the same references.

In the description below and in the claims, the following will be adopted in a nonlimiting manner:

An axial orientation that is parallel to the main axis "B" of the nose 30 of the gripping device 20, which is directed from bottom to top and which is indicated by the arrow "A" of the figures;

Radial orientations that are orthogonal to the main axis "B" of the gripping device 20 and directed from the inside to the outside by moving away from said main axis "B."

Figure 1:
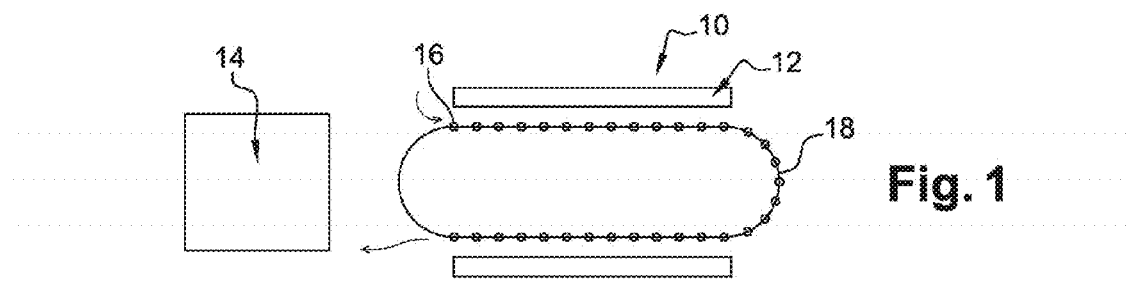
FIG. 1 is a diagrammatic top view that shows a facility for manufacturing containers comprising a furnace that is equipped with gripping devices produced according to the teachings of the invention.

Shown diagrammatically in FIG. 1 is a facility 10 for forming final containers such as bottles made of thermoplastic material. Such a facility 10 comprises a furnace 12 for heating and a station 14 for forming, for example by blow molding or stretch blow molding.

Initial containers, which are preforms 16 here, are intended to move into the furnace 12 for conditioning before being transferred one after the other to the forming station 14. The movement of the preforms 16 into the furnace 12 is carried out by means of a transporting device 18 comprising a conveying chain forming a closed loop.

The conveying chain is formed by the articulation of links (not shown). Each link comprises at least one device 20 for gripping a preform 16. The transporting device 18 comprises numerous gripping devices 20. With all of the gripping devices 20 being essentially identical, a single one of these gripping devices 20 will be described below.

Figure 2:
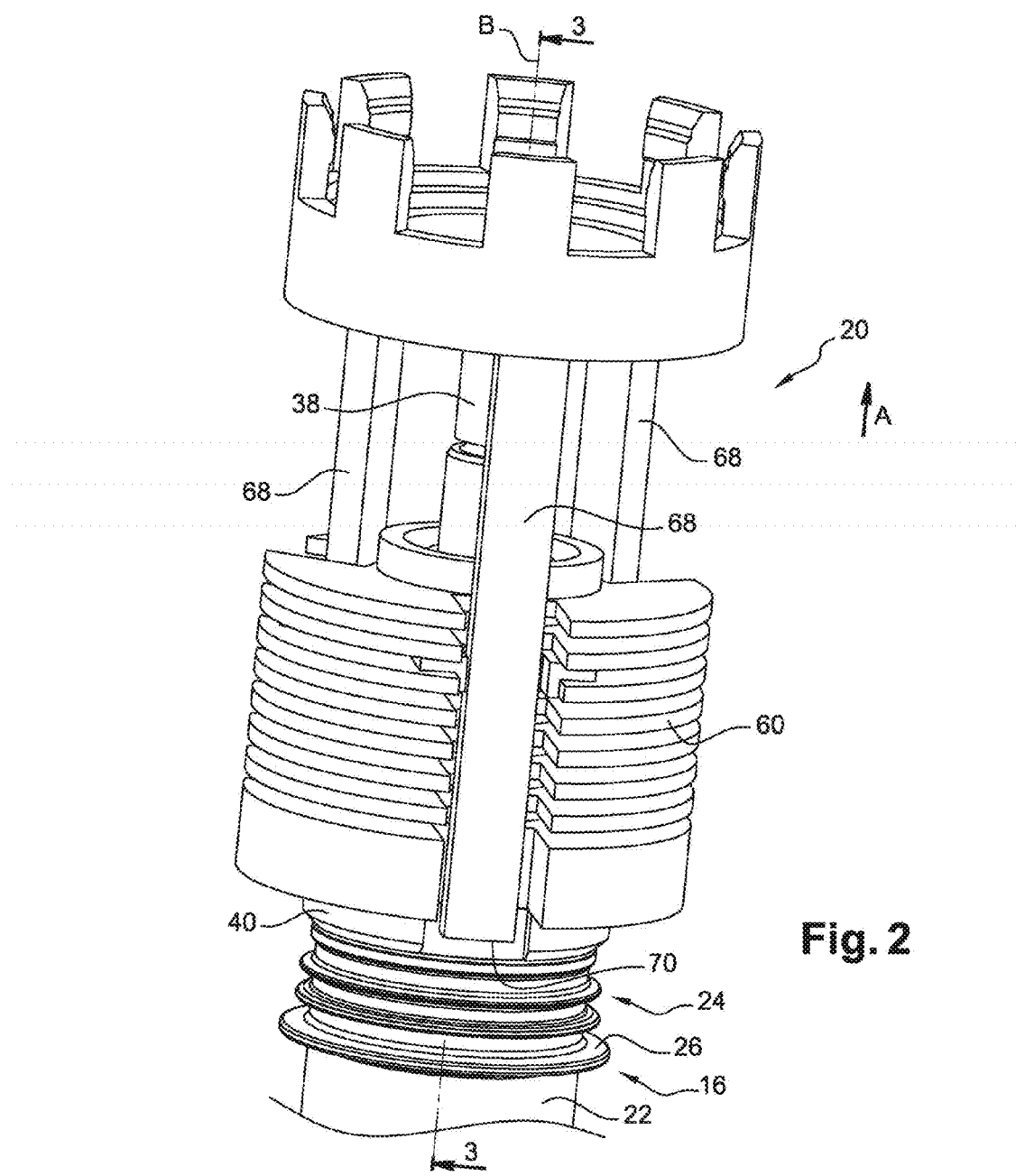
FIG. 2 is a perspective view that shows a gripping device produced according to the teachings of the invention, with a preform being picked up by the gripping device.

As shown in part in FIG. 2, a preform 16 is made of a thermoplastic material, such as PET, by injection molding. The preform 16 comprises a tubular body 22 that is open upward by means of a neck 24. The neck 24 has a tubular shape with axially oriented axis "B." The neck 24 is delimited downward by a collar 26 and upward by an upper end edge called "rim 28." The neck 24 is injected into its final shape, while the body 22 is intended to be deformed by stretch blow molding during a subsequent forming stage.

The gripping device 20 makes it possible to pick up a preform 16 by its neck 24.

Figure 3:
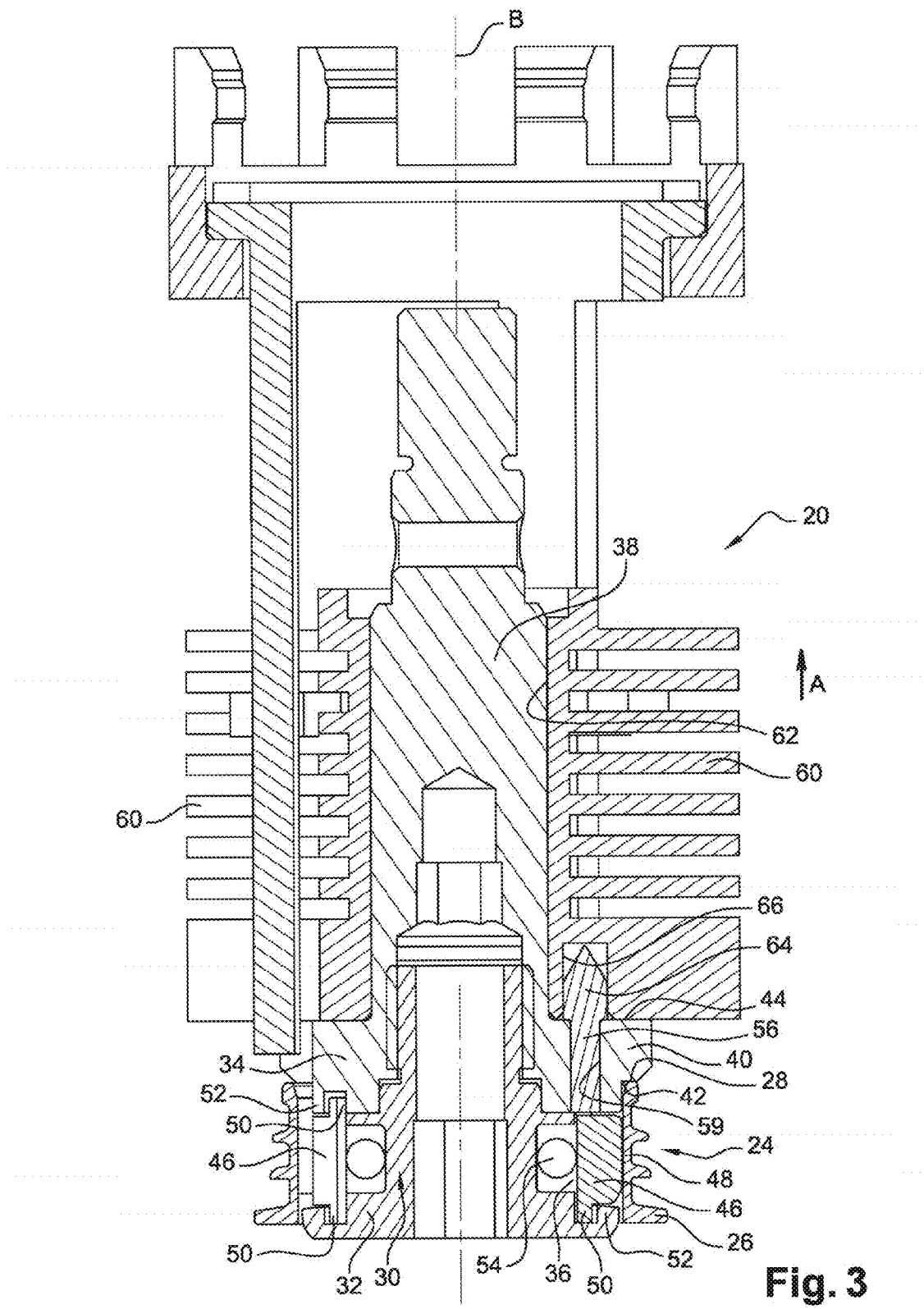
FIG. 3 is an axial cutaway view along the cutting plane 3-3 of FIG. 2, which shows in particular a guide pin of a jaw.

The gripping device 20 shown in FIGS. 2 and 3 comprises a lower end nose 30 that has an overall cylindrical shape with axially oriented main axis "B." As shown in FIG. 3, the nose 30 is suitable for being inserted axially into the neck 24 of the container 16. The nose 30 thus has a diameter that is slightly smaller than the inside diameter of the neck 24 of the preform 16 so as to make possible the axial sliding with radial play of the nose 30 in relation to the neck 24.

Figure 4:
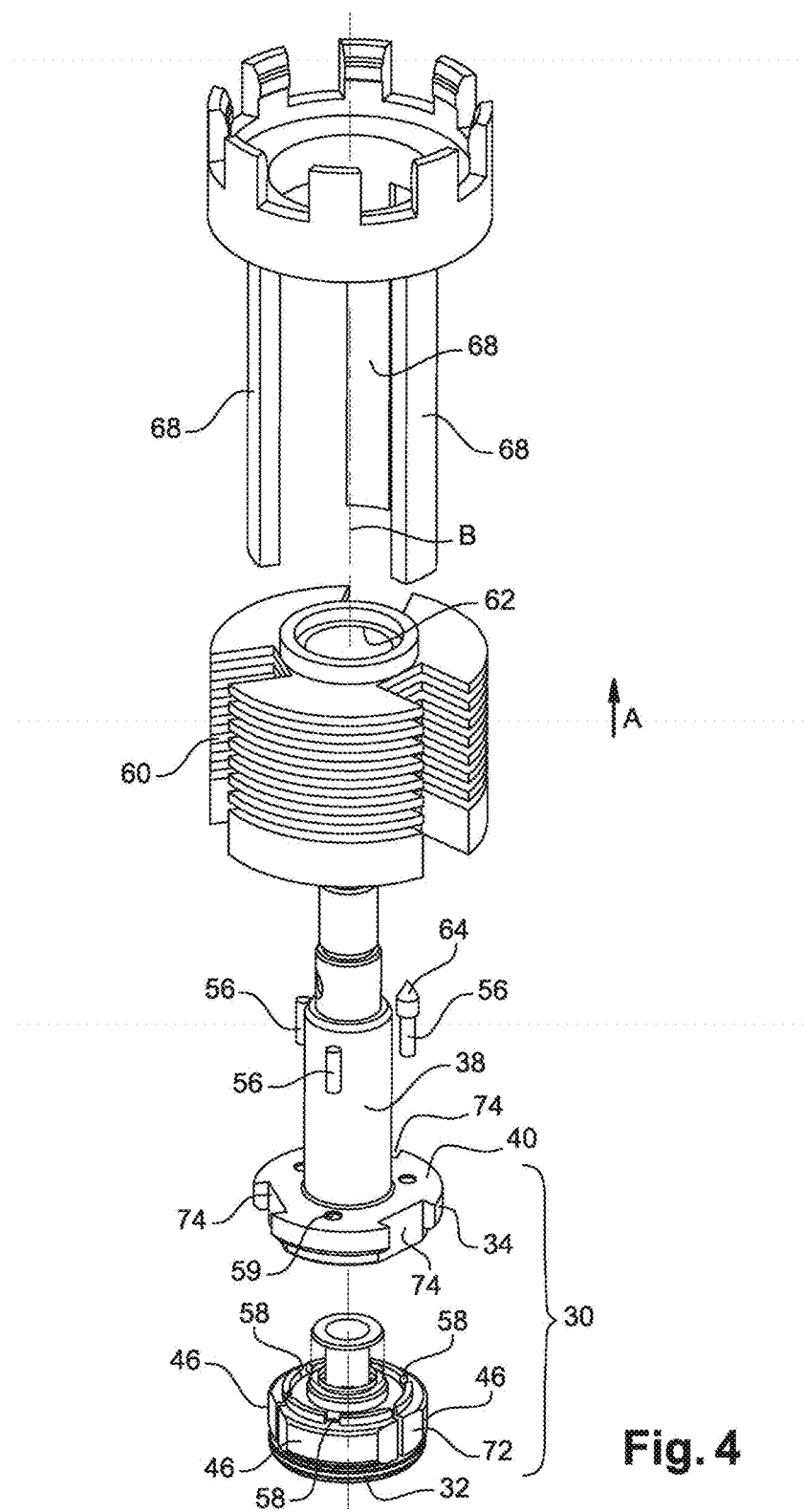
FIG. 4 is an exploded perspective view that shows the different elements that the gripping device of FIG. 2 comprises.

As shown in FIG. 4, the nose 30 is made of a lower element 32 and an upper element 34 that are attached to one another.

The two elements 32, 34 of the nose 30 axially delimit a peripheral annular housing 36 radially emptying toward the outside.

The upper element 34 is extended axially upward by a shaft 38 of axis "B" that is intended to be connected to an element (not shown) that controls the axial sliding of the gripping device 20 in relation to the conveying chain. The shaft 38 has a diameter that is smaller than that of the nose 30.

The upper element 34 also comprises a cylindrical intermediate segment 40 with a diameter that is larger than that of the nose 30 that is inserted between the nose 30 and the shaft 38. The intermediate segment 40 acts as a delimiter downward by a shoulder face 42 in relation to the nose 30. The intermediate segment 40 also comprises an upper face 44.

The shoulder face 42 is intended to abut against the rim 28 of the neck 24 when the nose 30 is inserted into the neck 24. The shoulder face 42 thus comprises an annular support surface that is formed only by the surface that is intended to come effectively into contact with the rim 28.

The gripping device 20 also comprises a number of jaws 46 that are enclosed in the housing 36 of the nose 30. The jaws 46 are uniformly distributed around the axis "B" of the nose 30. The jaws 46 are three in number here.

Figure 5:
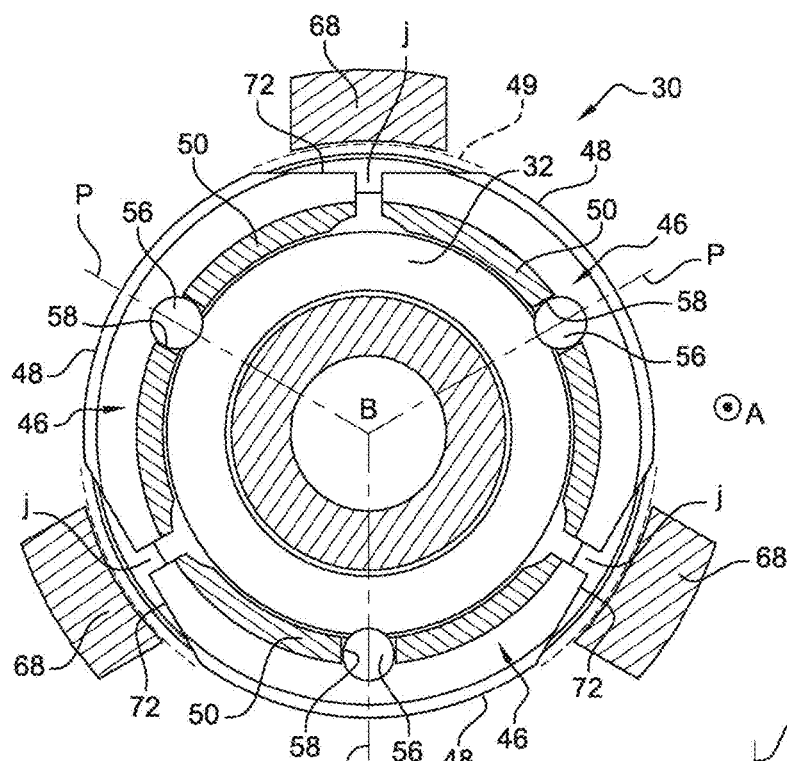
FIG. 5 is a transverse cutaway view along the cutting plane 5-5 of FIG. 6 that shows the nose of the gripping device according to the invention, with ejection pins occupying a lower ejection position.

The jaws 46 are all identical. Each jaw 46 has the shape of a ring segment with a diameter that is slightly larger than that of the inside wall of the neck 24. Each jaw 46 extends over an angular sector that is slightly smaller than 120° so that there is a circumferential operational play "j" between two adjacent jaws 46 when they are all housed in the nose 30, as shown in FIG. 5.

Thus, only the circumferential operational play "j" that is left free separates the circumferential end of each jaw 46 circumferentially from the end that is circumferentially opposite each adjacent jaw 46. "Left free" means that no obstacle is inserted circumferentially between two adjacent jaws 46.

Each jaw 46 has an outside support face 48 that is overall in the shape of a cylindrical sector that is intended to be arranged radially opposite the inside wall of the neck 24. In top view, as shown in FIG. 5, the outside faces 48 of the jaws 46 are circumscribed by a common imaginary cylinder 49 that is centered on the axis "B" and that is indicated in dotted lines in FIG. 5.

Each jaw 46 is mounted to move radially in the nose 30 between:
  A retracted position in which the support face 48 of the jaw 46 is retracted radially toward the inside for making possible the free axial sliding of the nose 30 in the neck 24; and
  An expanded position in which the support face 48 is moved radially toward the outside in radial projection in relation to the nose 30 for making possible the gripping of the neck 24 in relation to the nose 30 by pressing the support face 48 against the inside cylindrical wall of the neck 24.

Each jaw 46 is held prisoner in the nose 30 by means of lower or upper axial flanges 50, which are intended to abut radially against an axial skirt 52 associated with the lower element 32, or the upper element 34. This makes it possible to keep the jaws 46 prisoner in the nose 30. Each axial skirt 52 delimits here toward the outside an annular groove that is formed respectively in the upper face of the lower element 32 and in the lower face of the upper element 34.

The nose 30 also comprises elastic return means of the jaws 46 toward their expanded position. In the example shown in the figures, the elastic return means are formed by a ring 54 made of elastomer material that is inserted radially between the bottom of the housing 36 of the nose 30 and the jaws 46.

The nose 30 is thus intended to be "forced" into the neck 24. For this purpose, each jaw 46 has a draft angle that makes it possible to control automatically the sliding of the jaws 46 toward their retracted position during the axial insertion into the neck 24 by contact of the jaws 46 with the rim 28.

The housing 36 of the nose 30 has a shape that allows each jaw 46 limited travel by pivoting around an axial axis and around a circumferential axis. These degrees of freedom make it possible to keep the jaws 46 from jamming into the nose 30 during the forcible insertion of the nose 30 into the neck 24 of the preform 16.

The jaw assembly 46 is held circumferentially in a circumferential position that is determined in relation to the nose 30. Thus, the jaws 46 cannot rotate around the axis "B" of the nose 30. The jaws 46 are held in their circumferential position that is determined regardless of their radial position between the retracted position and the expanded position.

For this purpose, each jaw 46 is immobilized individually in a circumferential direction in relation to the nose 30. Each jaw 46 is immobilized here by means of a single associated guide pin 56 that is stationary in relation to one of the elements between said jaw 46 and the nose 30, with the guide pin 56 being accommodated by radial sliding into a groove 58 that is stationary in relation to the other one of the elements between said jaw 46 and the nose 30.

As is shown in FIGS. 4 and 5, in this example, the guide pin 56 is stationary in relation to the nose 30, while the groove 58 is stationary in relation to said jaw 46.

Each guide pin 56 has an axially oriented main axis here. Each pin is accommodated in an opening 59 that passes through the intermediate segment 40 of the upper element 34 of the nose 30, on a level with the upper flange 50 of the associated jaw 46.

The groove 58 is formed by a slot that is made in the upper flange 50 of the associated jaw 46. Thus, when the guide pin 56 is inserted into its opening 59, its end is engaged in the groove 58 of the associated jaw 46.

As shown in FIG. 5, for each jaw 46, the groove 58 and the guide pin 56 are positioned in an axial plane "P," i.e., a plane that contains the main axis "B" of the nose 30, with the plane "P" being oriented along the radial axis of displacement of said jaw 46. In the configuration shown in the figures, the groove 58 is thus arranged in the center of the jaw 46 in the circumferential direction, and it is oriented radially. This makes it possible to preserve the angular travel of the associated jaw 46 in relation to the nose 30 around an axis that is parallel to the axis "B" of the nose 30.

In addition, the guide pin 56 has a suitable shape for making possible said angular travel. The guide pin 56 has, for example, a circular cross-section. Thus, the mechanical link created between the jaw 46 and the nose 30 is not, strictly speaking, a slide link because of this possibility of angular travel.

As shown in FIGS. 2 to 4, the gripping device 20 comprises a ribbed radiator 60 that has an overall cylindrical shape of main axis "B." The radiator 60 is pierced axially by a central opening 62.

The shaft 38 is shrunk-on in the central opening 62 of the radiator 60 so that a lower face of the radiator 60 is resting flat against the upper face 44 of the upper element 34 of the nose 30. The radiator 60 is thus arranged above the nose 30.

The radiator 60 has an outside diameter that is larger than that of the intermediate segment 40 so as to extend in radial projection in relation to the nose 30.

The radiator 60 is immobilized in rotation around the axis "B" by an upper end head 64 of at least one guide pin 56, as is illustrated in FIG. 3. For this purpose, the radiator 60 has a suitable counterbore 66 for housing the head 64.

The head 64 has a diameter that is larger than that of the passage opening 59 of the guide pin 56. Thus, the head 64 is able to abut against the upper face 44 of the upper element 34 for positioning axially the guide pin 56 in relation to the nose 30. In particular, this keeps the pin from entering into contact with the associated jaw 46.

Only one guide pin 56 comprises a projecting head 64, with the other pins 56 being fixed axially in their respective opening 59 either by forcible insertion or by a non-projecting head (not shown) in relation to the upper face 44 of the intermediate segment 40.

As a variant of the invention, not shown, the three guide pins comprise a projecting head.

The gripping device 20 comprises means for ejecting the preform 16 when the nose 30 is held in the neck 24 by the jaws 46.

The ejection means comprise at least one axial ejection pin 68. Here, the ejection means comprise three identical ejection pins 68 that are distributed angularly around the main axis "B" of the nose 30. One free lower end 70 of each pin 68 is arranged axially on a level with the rim 28 of the neck 24.

As shown in FIG. 5, each pin 68 is arranged radially here opposite an associated circumferential play reserved between two adjacent jaws 46.

Figure 6:
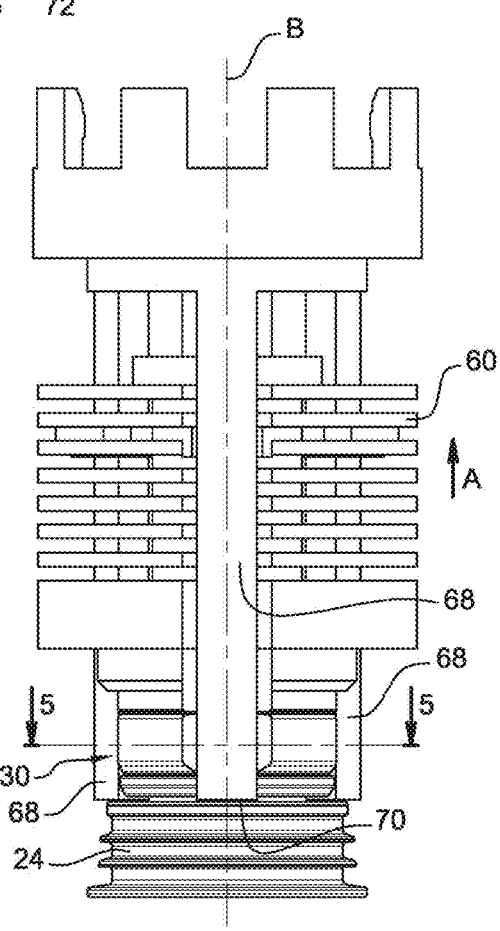
FIG. 6 is a side view that shows the pins of the gripping device of FIG. 2 in a lower ejection position.

The pins 68 are mounted integrally to slide axially in relation to the nose 30 between:

An upper rest position, as illustrated in FIG. 2, in which the free lower end 70 of each pin 68 is arranged axially above the nose 30; and A lower ejection position, as illustrated in FIG. 6, in which the free end 70 of the ejection pin is arranged axially below the nose 30.

Each ejection pin 68 impinges upon, or at the very least is tangent to, the straight cylinder 49 of imaginary revolution circumscribing the jaws 46 in the expanded position, with the imaginary cylinder 49 being centered on the axis "B." To keep the free end 70 of the pins 68 from abutting against a jaw 46 in the expanded position, a passage 72 is provided in the jaws 46 at the intersection between the circumscribed cylinder 49 and each ejection pin 68 for making it possible for each pin 68 to slide toward its ejection position. The passage 72 is carried out in such a way as to reserve an adequate radial play between the pins 68 and the jaws 46 to ensure that no collision will have taken place between these two elements even in the expanded position of the jaws 46.

In the example shown in the figures, the jaws 46 comprise at least one flat surface that forms the passage 72 of the associated pin 68. In the configuration that is shown in the figures, the passage 72 that is associated with a pin 68 is formed by a flat surface that is provided astride two adjacent jaws 46.

Figure 7:
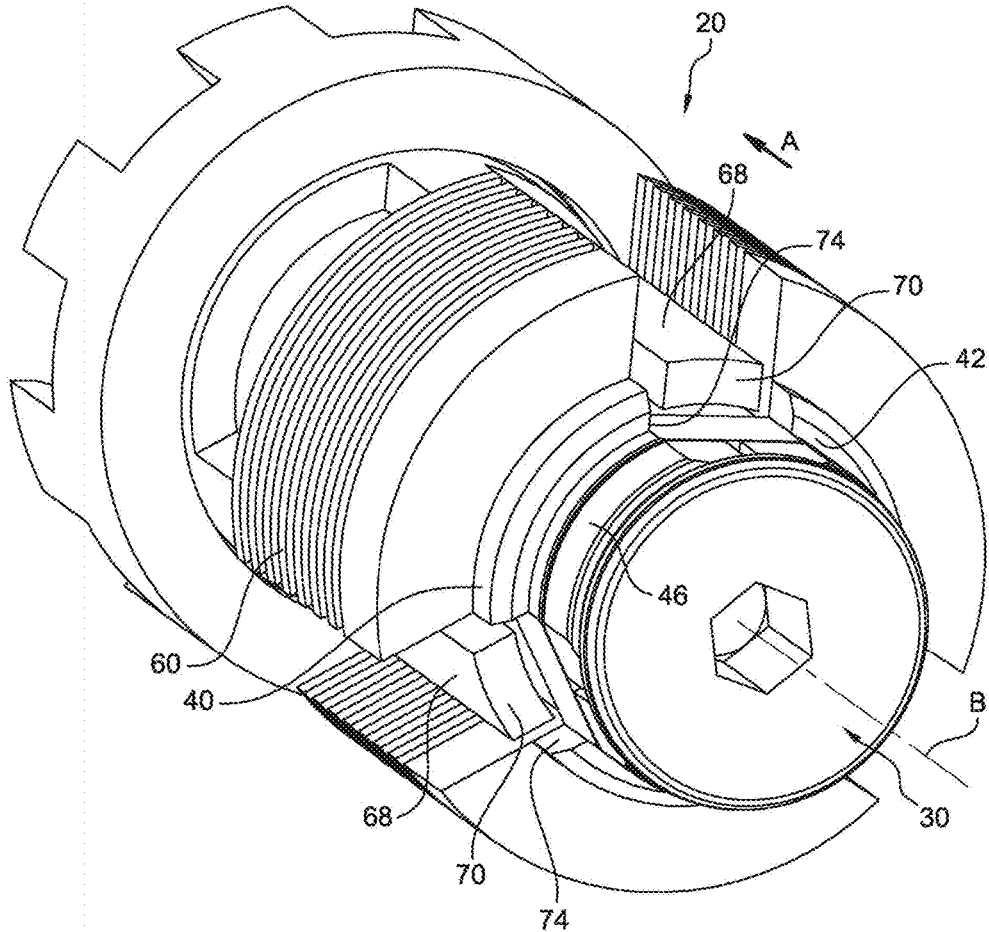
FIG. 7 is a perspective view that shows in detail the lower end of the nose of the gripping device of FIG. 2.

As shown in FIG. 7, the intermediate segment 40 and the radiator 60 also comprise axial passages each making it possible to house one of the pins 68.

Each passage empties downward in the shoulder face 42 in relation to the nose 30, for the benefit of an associated opening 74.

The free end 70 of each pin 68 is intended to stress the rim 28 of the neck 24 to eject the preform in relation to the jaws 46. To ensure a good support of pins 68 on the rim 28, each pin rests on the total thickness of an angular sector of the rim 28. Thus, the annular support surface of the shoulder face 42 is segmented by the passage openings 74 of the pins 68. The result is that when the pins 68 come into contact with the rim 28 during an ejection operation, certain so-called angular support sectors of the rim 28 rest only on the shoulder face 42, while the other so-called angular ejection sectors of the rim 28 are in contact only with an associated pin 68, with the support sectors being arranged to alternate circumferentially with the ejection sectors.

During the mounting of the gripping device 20, with reference to FIG. 4, the jaws 46 and the ring 54 that are elastic are first enclosed between the two lower and upper elements 32, 34 for forming the nose 30. The passages 72 of the jaws are axially arranged lined up with the passage openings 74 of the shoulder face 42.

Then, the guide pins 56 are inserted axially downward into their associated openings 59 in such a way as to immobilize the jaws 46 in their circumferential position that is determined in relation to the nose 30. The passages 72 of the jaws 46 thus remain constantly lined up with the passage openings 74 of the upper element 34 of the nose 30.

Next, the radiator 60 is threaded onto the shaft 38 in such a way that the heads 64 of the projecting guide pins 56 are accommodated in the counterbores 66 of the radiator. This makes it possible to immobilize the radiator 60 angularly in relation to the nose 30 so that the passages of pins 68 of the radiator 60 remain lined up with the passage openings 74 of the shoulder face 42 of the intermediate segment 40.

The guide pins 56 thus simultaneously make it possible to index the radiator 60 and the jaws 46 angularly in relation to the nose 30.

Finally, each ejection pin 68 is arranged in its respective passage. It will be possible to plan to insert a pad circumferentially from each side between the radiator 60 and the pin 68 to prevent the pins 68 from being offset in relation to their passage. The pads are advantageously produced from a material making it possible to promote the sliding of ejection pins 68.

During an operation for ejecting the preform 46, the pins 68 initially occupy their upper rest position as shown in FIGS. 2 and 3. The nose 30 is already inserted into the neck 24 of the preform 16 in such a way that the rim 28 is resting against the shoulder face 42, and the jaws 46 are forced radially against the inside cylindrical wall of the neck 24 to hold the preform 16.

Then, the pins 68 are slid axially toward their lower ejection position until they rest against the rim 28 of the preform 16. The pins 28 continue their sliding downward, stressing the rim 28 thus to bring about the sliding of the preform 16 in relation to the nose 30, until the pins 68 reach their lower ejection position, as indicated in FIG. 6. The nose 30 has then totally left the neck 24, and the preform 30 is ejected from the gripping device 20.

The gripping device 20 that is produced according to the teachings of the invention makes it possible to prevent the jaws 46 from clustering on just one side of the nose 30. This makes it possible in particular to keep the jaws 46 from jamming during the insertion into a neck 24.

In addition, the circumferential immobilization of the jaws 46 in a determined circumferential position makes it possible to create passages 72 for the ejection pins 68 in the jaws 46 without these passages 72 being offset circumferentially in relation to the pins 68. Thus, the pins 68 can be arranged radially close to the nose 30 in such a way as to rest on the entire radial thickness of the rim 28. This is in particular very advantageous when the thickness of the rim 28 is very small.

The invention claimed is:

1. Device (20) for gripping a container (16) made of thermoplastic material, in particular a preform that is intended to be shaped into a final container, with the gripping device (20) comprising:

A lower end nose (30) that has a main axis (B) and that is suitable for being inserted axially into the neck (24) of the container (16);

A number of jaws (46) in the shape of ring segments that are distributed uniformly around the axis (B) of the nose (30), which only a free operational play (j) separates circumferentially and which are mounted to move radially in the nose (30) between a retracted position that makes possible the free axial sliding of the nose (30) into the neck (24) and an expanded position that makes possible the gripping of the neck (24) in relation to the nose (30) by pressing against the inside wall of the neck (24);

Elastic return means (54) of the jaws toward their expanded position;

wherein the jaw assembly (46) is held circumferentially in a circumferential position that is determined in relation to the nose (30) by individual circumferential immobilization means of at least one jaw (46), with the operational play (j) being left free.

2. Gripping device (20) according to claim 1, wherein keeping the jaw assembly (46) in the circumferential position is carried out by the individual circumferential immobilization of each jaw (46) in relation to the nose (30) by means of a guide pin (56) that is stationary in relation to one of the elements between said jaw (46) and the nose (30), with the guide pin (56) being housed by sliding into a groove (58) that is stationary in relation to the other one of the elements between said jaw (46) and the nose (30).

3. Gripping device (20) according to claim 2, wherein the groove (58) and the guide pin (56) are positioned in an axial plane (P) that is oriented along the radial axis of displacement of said jaw (46).

4. Gripping device (20) according to claim 2, wherein the guide pin (56) is stationary in relation to the nose (30), while the groove (58) is stationary in relation to said jaw (46).

5. Gripping device (20) according to claim 4, wherein the guide pin (56) has a main axis that is parallel to the axis (B) of the nose (30).

6. Gripping device (20) according to claim 2, wherein the guide pin (56) has a suitable shape for making possible an angular travel of the jaw (46) in relation to the nose (30) around an axis that is parallel to the axis (B) of the nose (30).

7. Gripping device (20) according to claim 1, wherein the elastic return means are formed by a ring (54) made of elastomer material that is radially inserted between the nose (30) and the jaws (46).

8. Gripping device (20) according to claim 1, wherein the gripping device (20) comprises at least one axial pin (68) for ejecting the container (16) that is mounted to slide axially in relation to the nose (30) between an upper rest position in which a free end (70) of the pin (68) is arranged axially above the jaws (46), and a lower ejection position in which the free end (70) of the ejection pin (68) is arranged axially below the jaws (46), and wherein, during its sliding, each ejection pin (68) is able to come into contact with an imaginary cylinder (49) circumscribing the jaws (46) in the expanded position, a passage (72) being provided in the jaws (46) at the intersection between the circumscribed imaginary cylinder (49) and each ejection pin (68) for making it possible for each pin (68) to slide toward its ejection position without colliding with the jaws (46).

9. Gripping device (20) according to claim 8, wherein the jaws (46) comprise at least one flat surface forming the passage (72) of the associated pin (68).

10. Gripping device (20) according to claim 8, wherein the gripping device (20) comprises a shoulder face (42) in relation to the nose (30) that is intended to abut against a rim (28) of the neck when the nose (30) is inserted into the neck (24), with the ejection pin (68) passing through the shoulder face (42) for the benefit of an opening (74) that segments the annular stop surface intended to be effectively in contact with the rim (28).

11. Gripping device (20) according to claim 5, further comprising a radiator (60) that is arranged above the nose (30) and that extends in radial projection in relation to the nose (30).

12. Gripping device (20) according to claim 11, wherein the radiator (60) is immobilized in rotation by a head (64) that forms the upper end of at least one of the guide pins (56).

13. Device (18) for transporting a preform (16) into a furnace (12) for heating a facility (10) for forming containers of thermoplastic material, with the preform (16) being obtained by injection molding and comprising, at an upper axial end of its body (22), a tubular neck (24) that is injected directly into its final shape, wherein the preform (16) is held on the transporting device (18) by a gripping device (20) produced according to claim 1.

14. Gripping device (20) according to claim 3, wherein the guide pin (56) is stationary in relation to the nose (30), while the groove (58) is stationary in relation to said jaw (46).

15. Gripping device (20) according to claim 14, wherein the guide pin (56) has a main axis that is parallel to the axis (B) of the nose (30).

16. Gripping device (20) according to claim 9, wherein the gripping device (20) comprises a shoulder face (42) in relation to the nose (30) that is intended to abut against a rim (28) of the neck when the nose (30) is inserted into the neck (24), with the ejection pin (68) passing through the shoulder face (42) for the benefit of an opening (74) that segments the annular stop surface intended to be effectively in contact with the rim (28).

17. Gripping device (20) according to claim 1, further comprising a radiator (60) that is arranged above the nose (30) and that extends in radial projection in relation to the nose (30).

18. Gripping device (20) according to claim 6, further comprising a radiator (60) that is arranged above the nose (30) and that extends in radial projection in relation to the nose (30).

19. Gripping device (20) according to claim 18, wherein the radiator (60) is immobilized in rotation by a head (64) that forms the upper end of at least one of the guide pins (56).

\* \* \* \* \*